(12) United States Patent
Ohashi et al.

(10) Patent No.: US 11,146,094 B2
(45) Date of Patent: Oct. 12, 2021

(54) ELECTRICAL APPARATUS

(71) Applicant: Sony Interactive Entertainment Inc., Tokyo (JP)

(72) Inventors: Tsuyoshi Ohashi, Tokyo (JP); Toru Umetsu, Kanagawa (JP); Motoki Katayama, Fukushima (JP)

(73) Assignee: Sony Interactive Entertainment Inc., Tokyo (JP)

( * ) Notice: Subject to any disclaimer, the term of this patent is extended or adjusted under 35 U.S.C. 154(b) by 192 days.

(21) Appl. No.: 16/479,017

(22) PCT Filed: Jan. 18, 2018

(86) PCT No.: PCT/JP2018/001424
§ 371 (c)(1),
(2) Date: Jul. 18, 2019

(87) PCT Pub. No.: WO2018/139337
PCT Pub. Date: Aug. 2, 2018

(65) Prior Publication Data
US 2019/0356157 A1 Nov. 21, 2019

(30) Foreign Application Priority Data
Jan. 26, 2017 (JP) .............................. JP2017-012366

(51) Int. Cl.
*H02J 7/34* (2006.01)
*H01M 10/44* (2006.01)
*H02J 7/00* (2006.01)

(52) U.S. Cl.
CPC ............. *H02J 7/34* (2013.01); *H01M 10/441* (2013.01); *H02J 7/0029* (2013.01)

(58) Field of Classification Search
USPC ...................................................... 320/126
See application file for complete search history.

(56) References Cited

U.S. PATENT DOCUMENTS

2006/0087291 A1* 4/2006 Yamauchi ............. H02J 7/0063
320/137
2009/0051320 A1* 2/2009 Muntermann ........ H02J 7/0068
320/116
(Continued)

FOREIGN PATENT DOCUMENTS

| JP | 2007336782 A | 12/2007 |
|---|---|---|
| JP | 2009022099 A | 1/2009 |
| JP | 2015050813 A | 3/2015 |

OTHER PUBLICATIONS

International Search Report for corresponding PCT Application No. PCT/JP2018/001424, 4 pages, dated Feb. 13, 2018.
(Continued)

*Primary Examiner* — Mohammed Alam
(74) *Attorney, Agent, or Firm* — Matthew B. Dernier, Esq.

(57) ABSTRACT

An electrical apparatus incorporates a first rechargeable battery (11) and a second rechargeable battery (12) connected in parallel with the first rechargeable battery (11), the second rechargeable battery (12) having an allowable maximum discharge current larger than that of the first rechargeable battery (11). The electrical apparatus includes: a power supply path (15a) configured to input power supplied from the first rechargeable battery (11) and from the second rechargeable battery (12) to a load (15); and a discharge current limiting circuit connected serially with the first rechargeable battery (11) and configured to perform control in such a manner that a discharge current flowing from the first rechargeable battery (11) to the second rechargeable battery (12) and/or to the power supply path (15a) does not exceed the maximum discharge current of the first rechargeable battery (11).

8 Claims, 6 Drawing Sheets

(56) References Cited

U.S. PATENT DOCUMENTS

| | | | | |
|---|---|---|---|---|
| 2012/0319653 A1* | 12/2012 | Kumar | ............ | H02J 7/0021 |
| | | | | 320/118 |
| 2014/0145506 A1 | 5/2014 | Lu | | |
| 2019/0356134 A1* | 11/2019 | Ohashi | ............ | H02J 7/0003 |
| 2019/0356157 A1* | 11/2019 | Ohashi | ............ | H01M 10/441 |

OTHER PUBLICATIONS

International Preliminary Report on Patentability for corresponding PCT Application No. PCT/JP2018/001424, 13 pages, dated Aug. 8, 2019.

* cited by examiner

ELECTRICAL APPARATUS

TECHNICAL FIELD

The present invention relates to an electrical apparatus that uses multiple types of rechargeable batteries.

BACKGROUND ART

Some of the electrical apparatuses that use rechargeable batteries employ multiple types of them. With these electrical apparatuses, multiple types of rechargeable batteries are connected in parallel. Each of the parallelly connected rechargeable batteries supplies power necessary for the electrical apparatus to operate.

SUMMARY

Technical Problem

In the case where multiple types of rechargeable batteries are connected in parallel, a circulating current may flow from one rechargeable battery to another unless the batteries are in equilibrium state. The circulating current, if generated, may cause a large current to flow that can exceed a maximum charge current or a maximum discharge current allowed for each rechargeable battery. Where the electrical apparatus is operated by the power supplied from these rechargeable batteries, varying currents may flow from these rechargeable batteries due to their differences in characteristics. This can also cause the currents flowing from the rechargeable batteries to exceed the maximum charge current or the maximum discharge current thereof.

The present invention has been made in view of the above circumstances. An object of the invention is therefore to provide an electrical apparatus that uses multiple types of rechargeable batteries in combination, the electrical apparatus being configured to prevent currents exceeding a maximum discharge current from flowing out of the rechargeable batteries.

Solution to Problem

According to the present invention, there is provided an electrical apparatus incorporating a first rechargeable battery and a second rechargeable battery connected in parallel with the first rechargeable battery, the second rechargeable battery having an allowable maximum discharge current larger than that of the first rechargeable battery. The electrical apparatus includes: a power supply path configured to input power supplied from the first rechargeable battery and from the second rechargeable battery to a load; and a discharge current limiting circuit connected serially with the first rechargeable battery and configured to perform control in such a manner that a discharge current flowing from the first rechargeable battery to the second rechargeable battery and/or to the power supply path does not exceed the maximum discharge current of the first rechargeable battery.

DESCRIPTION OF EMBODIMENTS

Some preferred embodiments of the present invention are described below in detail with reference to the accompanying drawings.

First Embodiment

Figure 1:
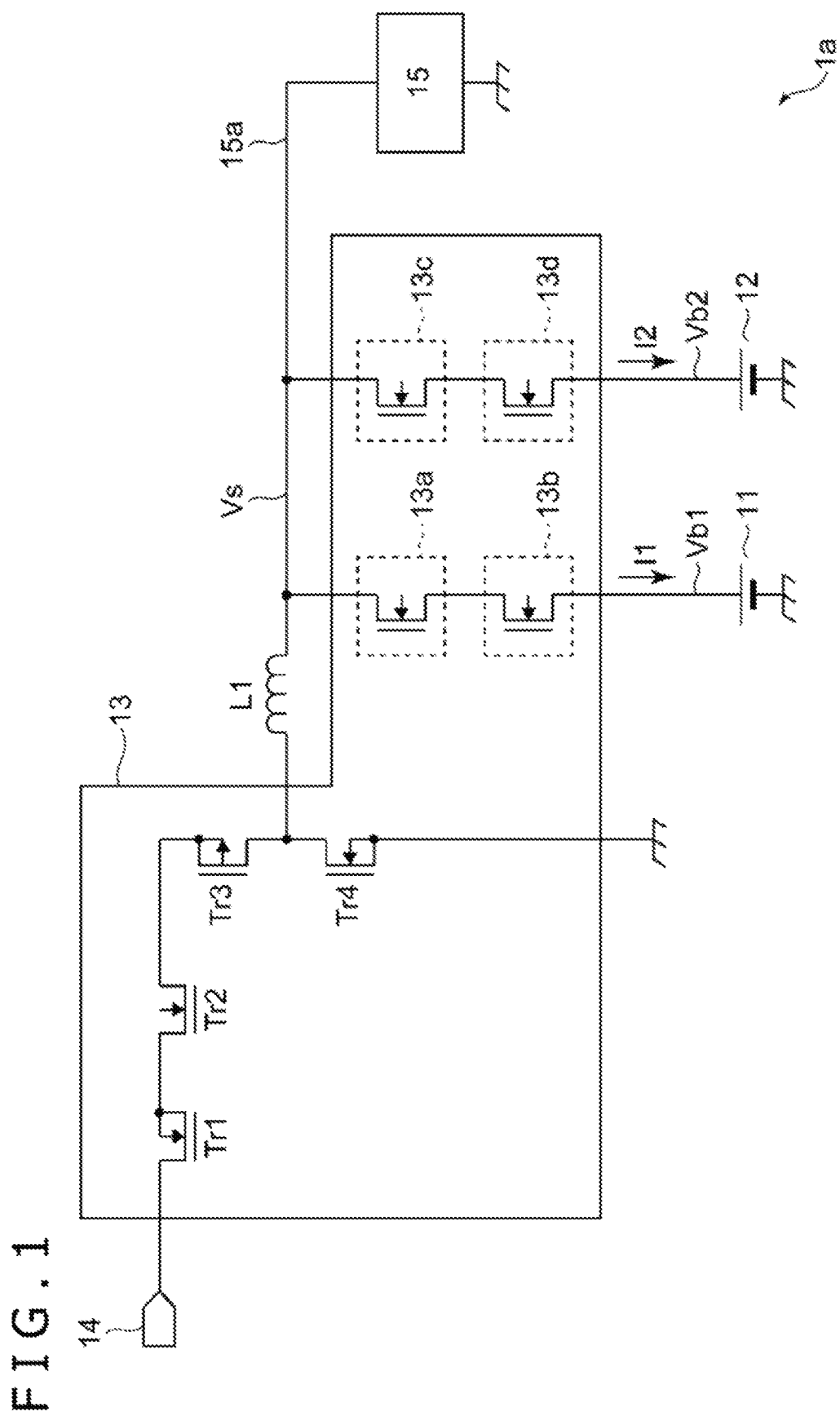
FIG. 1 depicts a circuit configuration of an electrical apparatus as a first embodiment of the present invention.

FIG. 1 depicts an overall circuit configuration of an electrical apparatus $1a$ as a first embodiment of the present invention. As illustrated in FIG. 1, the electrical apparatus $1a$ is capable of incorporating a first rechargeable battery 11 and a second rechargeable battery 12. The electrical apparatus $1a$ includes a charging circuit 13, a power supply terminal 14, and a load 15. The electrical apparatus $1a$ of the first embodiment may be any one of rechargeable battery-powered apparatuses including electrical tools, electrical vehicles, storage batteries, aircraft, mobile devices such as mobile phones, and head-mounted displays, for example.

The first rechargeable battery 11 and the second rechargeable battery 12 are secondary batteries such as lithium-ion batteries or all-solid batteries capable of repeatedly being charged and discharged. The electrical apparatus $1a$ operates on the power supplied by these rechargeable batteries. As depicted in FIG. 1, the two rechargeable batteries are connected in parallel with each other.

In the first embodiment, it is assumed that the first rechargeable battery 11 and the second rechargeable battery 12 differ from each other in characteristics. In particular, the two rechargeable batteries have different maximum charge currents and different maximum discharge currents. The maximum charge current (maximum charging rate) refers to the magnitude of the largest current allowed to flow into a rechargeable battery at the time of its charging. Likewise, the maximum discharge current (maximum discharging rate) refers to the magnitude of the largest current allowed to flow out of a rechargeable battery at the time of its discharging. A continuous flow of a current exceeding the maximum charge current or the maximum discharge current may incur deterioration of the rechargeable battery. In this description, the maximum charge current of the first rechargeable battery 11 is represented by reference sign $Ic1$ and the maximum discharge current thereof by $Id1$. The maximum charge current of the second rechargeable battery 12 is represented by reference sign $Ic2$ and the maximum discharge current thereof by $Id2$. It is assumed that the maximum charge current and the maximum discharge current of the second rechargeable battery 12 are larger than those of the first rechargeable battery 11. That is, the relations $Ic1<Ic2$ and $Id1<Id2$ are assumed to hold.

The charging circuit 13 may be an integrated circuit (IC) such as a charging IC configured to charge the first rechargeable battery 11 and the second rechargeable battery 12. The charging circuit 13 includes a first discharge current limiting circuit $13a$, a first charge current limiting circuit $13b$, a second discharge current limiting circuit $13c$, and a second charge current limiting circuit $13d$. As depicted in FIG. 1, the first discharge current limiting circuit 13a and the first charge current limiting circuit 13b are serially connected with the first rechargeable battery 11. The second discharge current limiting circuit 13c and the second charge current limiting circuit 13d are serially connected with the second rechargeable battery 12.

The power supply terminal 14 is connected with the input side of the charging circuit 13. The output side of the charging circuit 13 is connected with one end of a coil L1. The other end of the coil L1 is connected with the load 15. The other end of the coil L1 is also connected with one end of the first discharge current limiting circuit 13a and one end of the second discharge current limiting circuit 13c in the charging circuit 13.

The charging circuit 13 further includes circuit elements such as transistor switches Tr1 through Tr4. These circuit elements are used to suppress excess voltages or excess currents and to perform voltage control. In particular, the charging circuit 13 controls the transistor switches Tr3 and Tr4 to convert the power fed from an external power supply source through the power supply terminal 14 into a predetermined output voltage, and supplies the voltage to charge the first rechargeable battery 11 and the second rechargeable battery 12. In the description that follows, the voltage output by the charging circuit 13 is referred to as the output voltage Vs.

The first discharge current limiting circuit 13a, first charge current limiting circuit 13b, second discharge current limiting circuit 13c, and second charge current limiting circuit 13d in the charging circuit 13 each include a field effect transistor (FET). Depending on the state of the electrical apparatus 1a, each of these circuits performs control in a manner preventing the charge current or the discharge current flowing through the rechargeable battery serially connected therewith from exceeding a predetermined limit. More specifically, the first discharge current limiting circuit 13a performs control such that the discharge current flowing from the first rechargeable battery 11 to the load 15 does not exceed the maximum discharge current Id1. The first charge current limiting circuit 13b performs control such that the charge current flowing from an external power supply to the first rechargeable battery 11 does not exceed the maximum charge current Ic1. The second discharge current limiting circuit 13c performs control such that the discharge current flowing from the second rechargeable battery 12 to the load 15 does not exceed the maximum discharge current Id2. The second charge current limiting circuit 13d performs control such that the charge current flowing from the external power supply to the second rechargeable battery 12 does not exceed the maximum charge current Ic2. These current limiting circuits may be configured each using a low-drop-out (LDO) arrangement, for example. The current control executed by the charging circuit 13 using these current limiting circuits will be explained later in detail.

The power supply terminal 14 is connected with an external power supply source (referred to as the external power supply hereunder). The power to charge the first rechargeable battery 11 and the second rechargeable battery 12 is supplied from the external power supply via the power supply terminal 14. The power supply terminal 14 may be connected with an alternating current (AC) adaptor that converts power supplied from a commercial AC power source, for example, into a direct current to be output. Alternatively, the power supply terminal 14 may be connected with an electrical apparatus such as a universal serial bus (USB) host device supporting the supply of power.

The load 15 may be a circuit element that implements the intended functions of the electrical apparatus 1a. As such, the load 15 operates on the power supplied from the external power supply, from the first rechargeable battery 11, and from the second rechargeable battery 12. The load 15 may include various components such as a motor and an integrated circuit corresponding to the type of the electrical apparatus 1a. In the case where the electrical apparatus 1a is a storage battery, for example, the load that operates on the power supplied from the rechargeable batteries may be located outside the electrical apparatus 1a. The load 15 is connected with the charging circuit 13 via a power supply path 15a. The power supplied from the first rechargeable battery 11 and the power from the second rechargeable battery 12 are both input to the load 15 via the power supply path 15a.

What follows is an explanation of the specifics of the current control implemented by the charging circuit 13. The charging circuit 13 during operation monitors a current I1 flowing to the first rechargeable battery 11 and a current I2 flowing to the second rechargeable battery 12. In the case where the charge current flowing to any one of the rechargeable batteries exceeds the maximum charge current, the charging circuit 13 operates the charge current limiting circuits to keep the charge current equal to the maximum charge current or less. In the case where the discharge current flowing from any one of the rechargeable batteries exceeds the maximum discharge current, the charging circuit 13 operates the discharge current limiting circuits to keep the discharge current equal to the maximum discharge current or less. In this manner, the charge current and the discharge current are both kept equal to the maximum charge current and the maximum discharge current or less, respectively. Even when no power is supplied from the external power supply to the rechargeable batteries and no power is fed from any of the rechargeable batteries to the load 15, a circulating current may flow between the first rechargeable battery 11 and the second rechargeable battery 12. For this reason, the charging circuit 13 is required to carry out the current control above.

Figure 2:
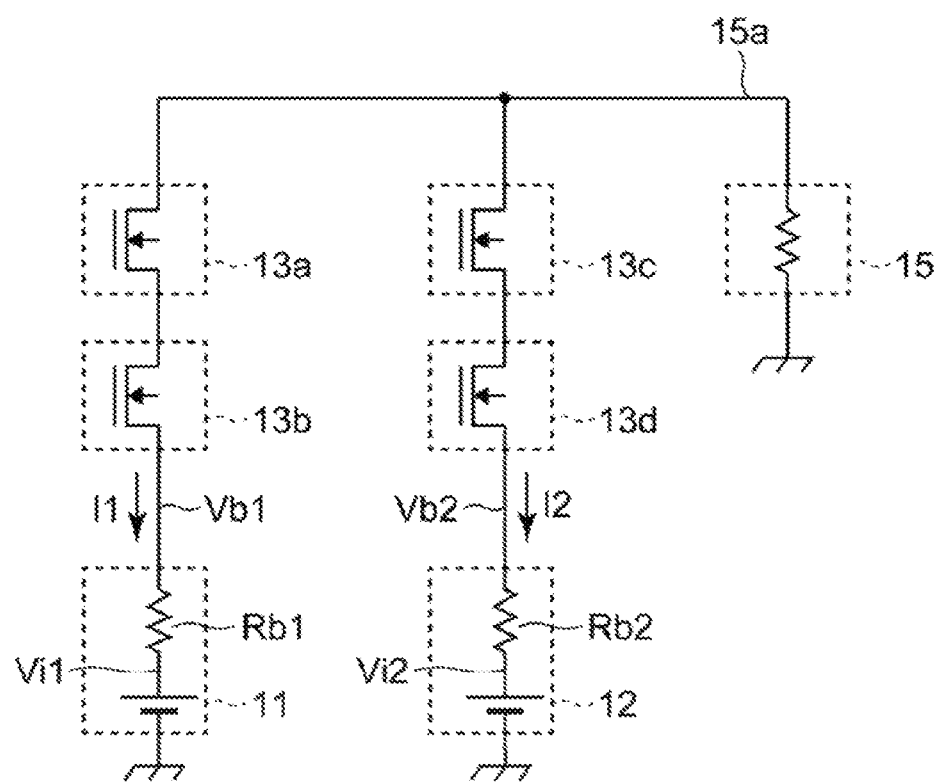
FIG. 2 explains currents flowing through a first rechargeable battery and a second rechargeable battery of the electrical apparatus as the first embodiment of the present invention.

The specifics of the current control executed by the charging circuit 13 are explained below with reference to FIG. 2. FIG. 2 conceptually explains the currents flowing through the first rechargeable battery 11 and the second rechargeable battery 12 connected in parallel with each other. In the ensuing description, the battery voltage, measured by the charging circuit 13, of the first rechargeable battery 11 is represented by reference sign Vb1 and the battery voltage of the second rechargeable battery 12 by Vb2. The internal voltage of the first rechargeable battery 11 minus voltage variations attributable to an internal resistance is represented by reference sign Vi1 and the internal voltage of the second rechargeable battery 12 minus voltage variations attributable to an internal resistance is represented by Vi2. It is assumed here that the internal resistance Rb1 of the first rechargeable battery 11 is $0.2\Omega$ and the internal resistance Rb2 of the second rechargeable battery 12 is $0.1\Omega$. It is also assumed that the maximum charge current Ic1 and the maximum discharge current Id1 of the first rechargeable battery 11 are both 0.1 A and that the maximum charge current Ic2 and the maximum discharge current Id2 of the second rechargeable battery 12 are both 1 A. It is further assumed that for purpose of explanation, the resistance value of each current limiting circuit is negligible.

Explained first is the control over a first state in which the first rechargeable battery 11 and the second rechargeable battery 12 as a whole are neither charged nor discharged.

This is a state where only a circulating current flows between the two rechargeable batteries and where the battery voltage of the second rechargeable battery 12 is higher than that of the first rechargeable battery 11. In this state, the circulating current flows from the second rechargeable battery 12 to the first rechargeable battery 11, with the second rechargeable battery 12 discharged and the first rechargeable battery 11 charged. For example, suppose that Vi1=3.6 V and Vi2=4.2 V. Suppose also here that the current limiting circuits are absent and that the first rechargeable battery 11 and the second rechargeable battery 12 are directly connected with each other. In this case, the magnitude of the circulating current is calculated as follows:

(4.2 V−3.6 V)/(0.2Ω+0.1Ω)=2 A

That is, a current of 2 A exceeding both the maximum charge current of 0.1 A for the first rechargeable battery 11 and the maximum discharge current of 1 A for the second rechargeable battery 12 flows from the second rechargeable battery 12 to the first rechargeable battery 11.

Thus, in the first state, the charging circuit 13 operates the first charge current limiting circuit 13b to perform control such that the charge current flowing to the first rechargeable battery 11 is kept at 0.1 A. At this time, the discharge current flowing out of the second rechargeable battery 12 is also kept at 0.1 A, which is equal to or lower than the maximum discharge current Id2 of the second rechargeable battery 12. This eliminates the need for the second discharge current limiting circuit 13c to limit currents. Thus, the charging circuit 13 simply turns on the FETs in the first discharge current limiting circuit 13a, second discharge current limiting circuit 13c, and second charge current limiting circuit 13d to let currents flow therethrough, and does not cause the current limiting circuits to limit currents.

Explained next is the control over a second state in which the first rechargeable battery 11 and the second rechargeable battery 12 are neither charged nor discharged as in the first state, with the battery voltage of the first rechargeable battery 11 higher than that of the second rechargeable battery 12. In this state, a circulating current flows from the first rechargeable battery 11 to the second rechargeable battery 12. As a specific example opposite to the first example, suppose that Vi1=4.2 V and Vi2=3.6 V. In this case, without the presence of the current limiting circuits, the magnitude itself of the current is 2 A, which is the same as in the first state.

In the second state, the charging circuit 13 operates the first discharge current limiting circuit 13a to perform control such that the current I1 flowing out of the first rechargeable battery 11 is kept at 0.1 A. This also keeps the charge current flowing into the second rechargeable battery 12 at 0.1 A, which eliminates the need for the second charge current limiting circuit 13d to limit currents. Thus, the charging circuit 13 simply turns on the FETs in the first charge current limiting circuit 13b, second discharge current limiting circuit 13c, and second charge current limiting circuit 13d to let currents flow therethrough, and does not cause the current limiting circuits to limit currents.

Explained next is the control over a third state in which the load 15 operates by consuming power. As a specific example, the resistance value of the load 15 is assumed here to be 1.8Ω. If it is assumed that Vi1=Vi2=4.2 V without the presence of the current limiting circuits, the voltage input to the load 15 is set to 4.05 V. In turn, the current I1 is set to 0.75 A and the current I2 is set to 1.5 A, the two currents being added up to become a current of 2.25 A flowing into the load 15. In this case, the currents I1 and I2 both exceed the maximum discharge currents of the rechargeable batteries.

Thus, the charging circuit 13 operates the first discharge current limiting circuit 13a to perform control such that the current I1 is kept at 0.1 A. At the same time, the charging circuit 13 operates the second discharge current limiting circuit 13c to perform control such that the current I2 is kept at 1 A. This prevents currents exceeding the maximum discharge currents of the rechargeable batteries from flowing out of them. At this time, a maximum current of 1.1 A flows to the load 15.

As explained above, where the electrical apparatus 1a is not connected with the external power supply, the charging circuit 13 transitions to one of the first through the third states depending on the operating state of the load 15 and on the battery voltages of the rechargeable batteries. Following transition, the charging circuit 13 operates the current limiting circuits in accordance with the state in effect. In this manner, currents exceeding the maximum charge currents or the maximum discharge currents of the rechargeable batteries are continuously prevented from flowing therethrough.

Explained next is the control over the state in which the external power supply is connected with the power supply terminal 14 so that the power from the external power supply charges the first rechargeable battery 11 and the second rechargeable battery 12. This is a fourth state where the external power supply is connected and where the battery voltage Vb2 of the second rechargeable battery 12 is equal to or higher than the battery voltage Vb1 of the first rechargeable battery 11. In this state, the charging circuit 13 operates the first charge current limiting circuit 13b to perform control such that the charge current flowing to the first rechargeable battery 11 does not exceed the maximum charge current Ic1.

Further in this state, the charging circuit 13 may operate the second charge current limiting circuit 13d to perform control such that the charge current flowing to the second rechargeable battery 12 does not exceed the maximum charge current Ic2. However, since the charging circuit 13 carries out overall charging control using the transistor switches Tr1 through Tr4 at the time of charging, it is not mandatory for the charging circuit 13 to operate the second charge current limiting circuit 13d. In this case, the charging circuit 13 adjusts the output voltage Vs by controlling the transistor switches Tr1 through Tr4 in such a manner as to keep the current I2 flowing into the second rechargeable battery 12 at a predetermined value (equal to or lower than the maximum charge current Ic2). In this manner, the charging circuit 13 can charge the second rechargeable battery 12 while keeping the charge current at a value not exceeding the maximum charge current Ic2 without operating the second charge current limiting circuit 13d.

In this state, the charging circuit 13 can charge the second rechargeable battery 12 in a procedure similar to a commonly practiced charging sequence. For example, the charging circuit 13 charges the first rechargeable battery 11 by operating the first charge current limiting circuit 13b to limit currents while simultaneously charging the second rechargeable battery 12 with a constant current. When the battery voltage Vb2 attains a target value, the charging circuit 13 transitions to constant voltage charging. In this state, the current I2 flowing into the second rechargeable battery 12 gradually drops, so that there is no fear of the charge current exceeding the current value applicable at the time of constant current charging. When the current I2 drops to the predetermined value or below, the charging circuit 13 turns off the FET in the second charge current limiting circuit 13*d* to stop charging the second rechargeable battery 12. Thereafter, the charging circuit 13 charges the first rechargeable battery 11 in a similar procedure. That is, the charging circuit 13 continuously charges the first rechargeable battery 11 with a constant current while operating the first charge current limiting circuit 13*b* to limit currents. When the battery voltage Vb1 attains a target value, the charging circuit 13 transitions to constant voltage charging. Thereafter, when the current I1 drops to the predetermined value or below, the charging circuit 13 turns off the FET in the first charge current limiting circuit 13*b* to stop charging the first rechargeable battery 11. In the case where the battery voltage Vb1 becomes higher than the battery voltage Vb2 while the two rechargeable batteries are being charged, the charging circuit 13 transitions to a fifth state, to be explained below.

Explained next is the fifth state where the external power supply is connected and where the battery voltage Vb1 of the first rechargeable battery 11 is higher than the battery voltage Vb2 of the second rechargeable battery 12. In this case, the charging circuit 13 turns off the FETs in the first discharge current limiting circuit 13*a* and in the first charge current limiting circuit 13*b* to stop charging the first rechargeable battery 11. Then, as in the fourth state, the charging circuit 13 charges the second rechargeable battery 12 while preventing the charge current exceeding the maximum charge current Ic2 from flowing to that rechargeable battery. When the second rechargeable battery 12 has been charged to such an extent that its battery voltage Vb2 becomes equal to or higher than the battery voltage Vb1 of the first rechargeable battery 11, the charging circuit 13 transitions to the above-described fourth state.

To make transition between the above-described states requires the charging circuit 13 to measure the battery voltages of the first rechargeable battery 11 and of the second rechargeable battery 12. At this time, if the battery voltage of the first rechargeable battery 11 and that of the second rechargeable battery 12 remain connected with each other in parallel, with none of the current limiting circuits operated to limit currents, the battery voltages of the rechargeable batteries cannot be measured independently due to the circulating current incurred therebetween. For this reason, the charging circuit 13 measures independently the battery voltage of the first rechargeable battery 11 and that of the second rechargeable battery 12 by turning off the FETs in all the current limiting circuits in an initial state such as at the time of shipment from the factory or upon replacement of the rechargeable batteries. The charging circuit 13 determines which state to transition to by comparing the battery voltages thus measured. Thereafter, in any of the first through the fifth states, the charging circuit 13 can independently measure the battery voltage of each rechargeable battery either because one of the current limiting circuits is operated to limit currents or because the FET in the relevant current limiting circuit is turned off. In each of the states, the charging circuit 13 measures periodically the battery voltage Vb1 of the first rechargeable battery 11 and the battery voltage Vb2 of the second rechargeable battery 12 and, depending on the measurements taken, transitions to another state.

As explained above, the electrical apparatus 1*a* of the first embodiment has the current limiting circuits connected individually with the rechargeable batteries to perform control such that the charge currents and discharge currents flowing through the rechargeable batteries do not exceed the maximum charge current or maximum discharge current of any of the rechargeable batteries.

Whereas it was explained above that the current limiting circuits are incorporated in the charging circuit 13, these current limiting circuits may alternatively be provided outside the charging circuit 13. In this case, the charging circuit 13 or some other control circuit monitors the battery voltages of the rechargeable batteries as well as the currents flowing therethrough and, on the basis of the result of the monitoring, controls the operation of each of the current limiting circuits.

Second Embodiment

Figure 3:
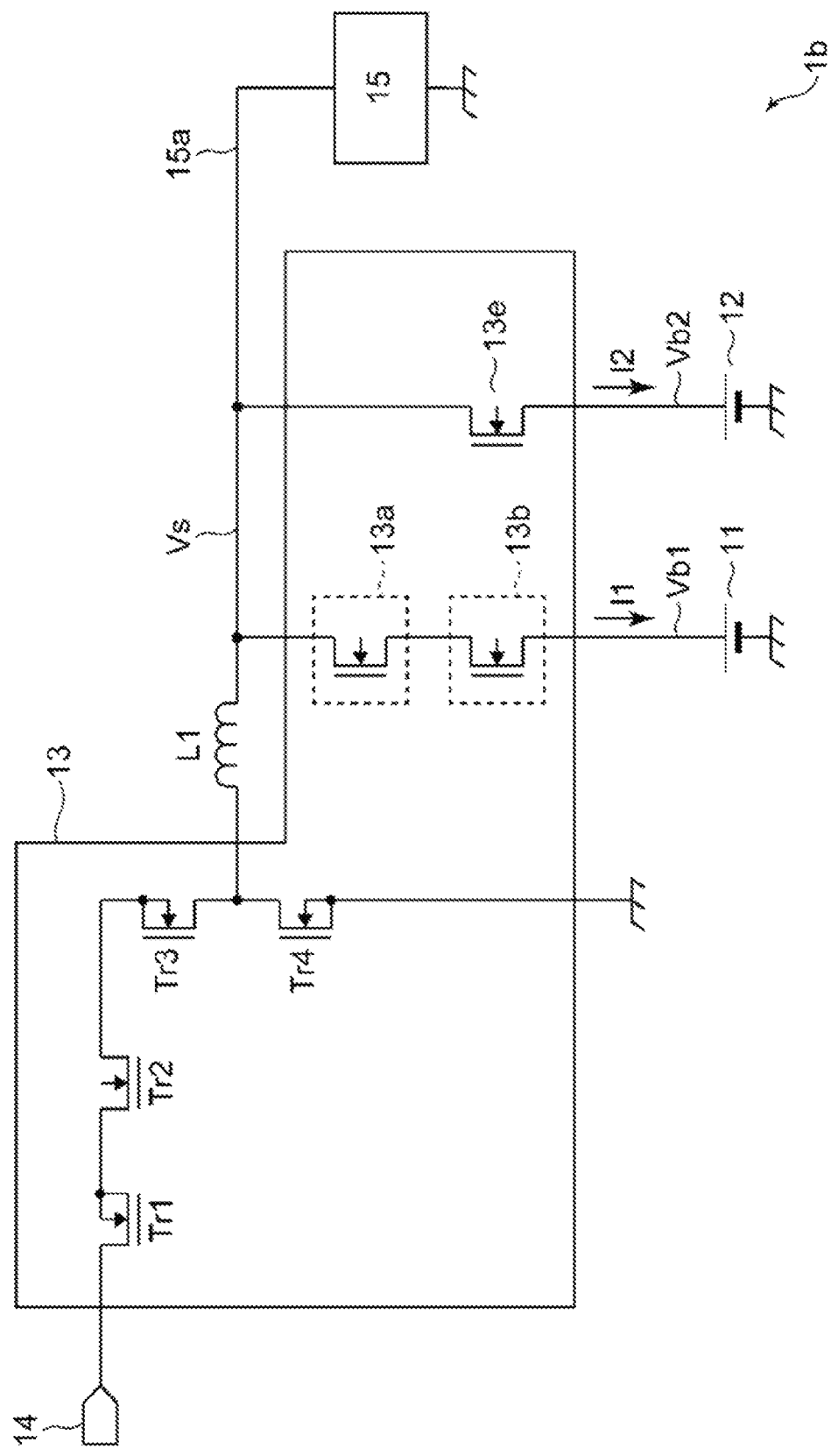
FIG. 3 depicts a circuit configuration of an electrical apparatus as a second embodiment of the present invention.

FIG. 3 depicts an overall circuit configuration of an electrical apparatus 1*b* as a second embodiment of the present invention. Compared with the first embodiment, the second embodiment excludes the second discharge current limiting circuit 13*c* and the second charge current limiting circuit 13*d* and has an FET 13*e* connected serially with the second rechargeable battery 12 instead. The other components of the second embodiment are similar to those of the first embodiment. In the description that follows, those components of the second embodiment that are functionally similar to those of the first embodiment are designated by the same reference signs and are not described in detail. It is assumed that in the second embodiment as in the first embodiment, the maximum discharge current and the maximum charge current of the second rechargeable battery 12 are larger than those of the first rechargeable battery 11.

In the electrical apparatus 1*a* of the first embodiment, if the charging circuit 13 itself can control the charge current flowing to the second rechargeable battery 12, there is no need to operate the second charge current limiting circuit 13*d* when charging the second rechargeable battery 12, as described above. If the maximum charge current of the second rechargeable battery 12 is larger than the maximum discharge current of the first rechargeable battery 11, there is also no need to operate the second charge current limiting circuit 13*d* in the second state discussed above. For this reason, the second embodiment is configured to exclude the second charge current limiting circuit 13*d*. In the case where the second rechargeable battery 12 is to be charged (when the above-described fourth or the fifth state is in effect), the charging circuit 13 adjusts the output voltage Vs by controlling the transistor switches Tr1 through Tr4 in such a manner that the current I2 flowing to the second rechargeable battery 12 takes a predetermined value (equal to or lower than the maximum charge current Ic2 of the second rechargeable battery 12).

Generally, at the time of electrical apparatus circuit design, the circuits of the apparatus are designed in such a manner that the magnitude of the current needed to operate the load of the apparatus does not exceed the magnitude of the current that can be supplied by batteries. Thus, in the electrical apparatus 1*a* of the first embodiment, if the magnitude of the current demanded by the load 15 does not exceed the maximum discharge current Id2 of the second rechargeable battery 12, it is not necessary to limit currents using the second discharge current limiting circuit 13*c*. It is for this reason that the second embodiment is configured to exclude the second discharge current limiting circuit 13*c*. Where the load 15 is to be operated with the second embodiment (i.e., in the above-described third state), the first discharge current limiting circuit 13*a* is operated to limit the magnitude of the discharge current flowing out of the first rechargeable battery 11 to the maximum discharge current Id1 or less. At this time, the magnitude of the discharge current flowing out of the second rechargeable battery 12 does not exceed the magnitude of the current demanded by the load 15, so that the maximum discharge current Id2 is not exceeded.

As in the first embodiment, the charging circuit 13 in the second embodiment periodically measures the battery voltages Vb1 and Vb2 while the external power supply is not connected. If the result of the measurement indicates that Vb1<Vb2, the charging circuit 13 turns on the FET 13e and the FET in the first discharge current limiting circuit 13a while simultaneously operating the first charge current limiting circuit 13b to limit the current flowing from the second rechargeable battery 12 into the first rechargeable battery 11 to the maximum charge current Id1 or less. In the case where Vb1≥Vb2, the charging circuit 13 turns on the FET 13e and the FET in the first charge current limiting circuit 13b while operating the first discharge current limiting circuit 13a to limit the current flowing from the first rechargeable battery 11 into the second rechargeable battery 12 to the maximum discharge current Id1 or less.

When the external power supply is connected, the charging circuit 13 charges the first rechargeable battery 11 and the second rechargeable battery 12 in a manner similar to the electrical apparatus 1a of the first embodiment. At the time of terminating the charging of the second rechargeable battery 12, the charging circuit 13 turns off the FET 13e to prevent currents from flowing into the second rechargeable battery 12.

As explained above, the electrical apparatus 1b of the second embodiment, as with the first embodiment, is configured to prevent the charge currents and discharge currents flowing through the rechargeable batteries from exceeding the maximum charge current or maximum discharge current of any of these batteries. Compared with the first embodiment, given that the second rechargeable battery 12 has the maximum charge current and the maximum discharge current larger than those of the first rechargeable battery 11, there is no need to provide a current limiting circuit that individually limits the charge and discharge currents of the second rechargeable battery 12.

Third Embodiment

Figure 4:
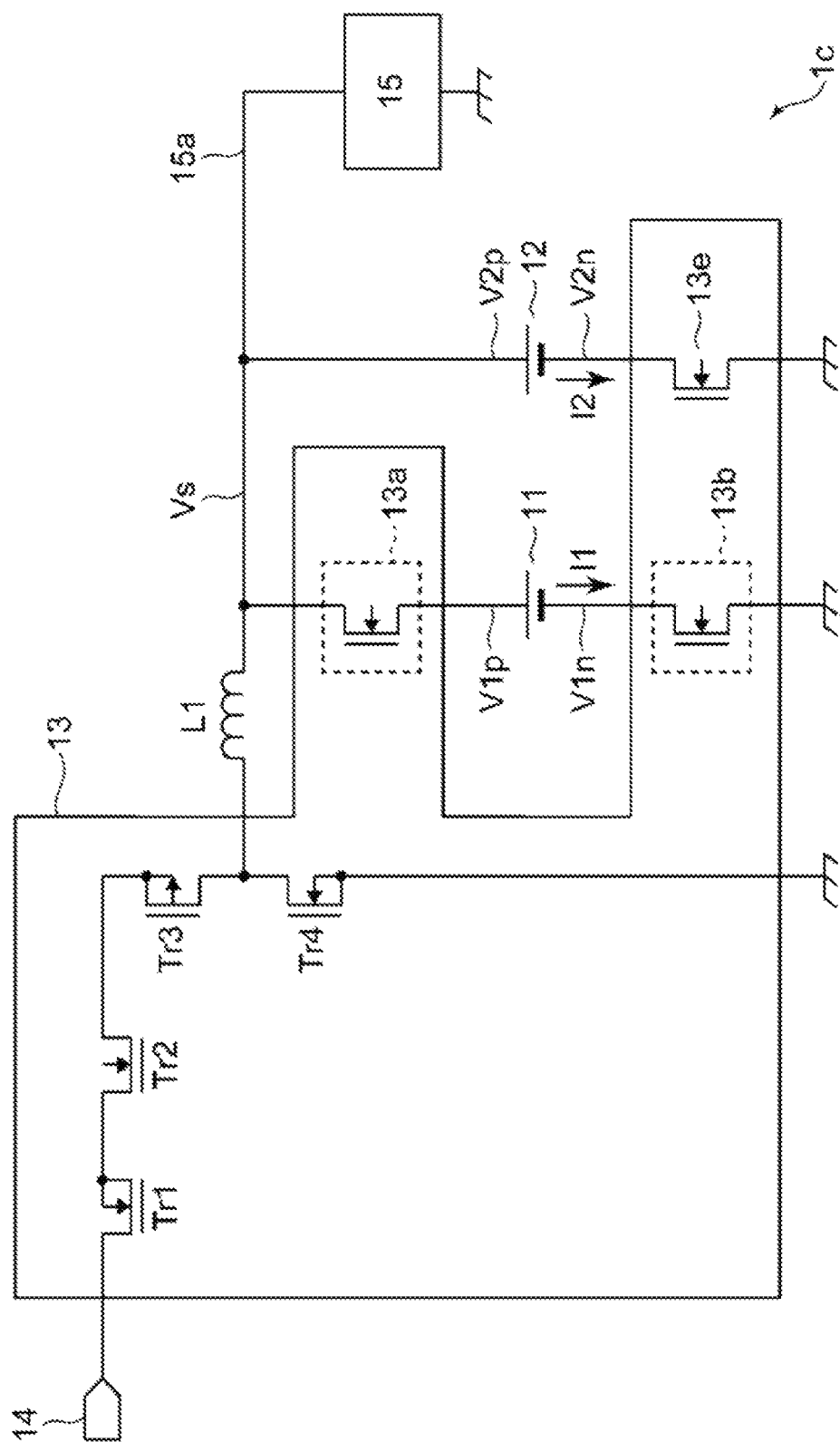
FIG. 4 depicts a circuit configuration of an electrical apparatus as a third embodiment of the present invention.

FIG. 4 depicts an overall circuit configuration of an electrical apparatus 1c as a third embodiment of the present invention. In the third embodiment, compared with the second embodiment, the first charge current limiting circuit 13b and the FET 13e are connected in different positions. The other components of the third embodiment are similar to those of the second embodiment. In the ensuing description, those components of the third embodiment that are functionally similar to those of the second embodiment are designated by the same reference signs and are not described in detail. It is assumed that in the third embodiment as in the first and the second embodiments, the maximum discharge current and the maximum charge current of the second rechargeable battery 12 are larger than those of the first rechargeable battery 11.

In the third embodiment, the first charge current limiting circuit 13b is connected with the negative side of the first rechargeable battery 11. The FET 13e is connected also with the negative side of the second rechargeable battery 12. The charging circuit 13 periodically measures a positive-side voltage V1p and a negative-side voltage V1n of the first rechargeable battery 11 as well as a positive-side voltage V2p and a negative-side voltage V2n of the second rechargeable battery 12. On the basis of the measurements taken, the charging circuit 13 calculates the battery voltage Vb1 of the first rechargeable battery 11 (=V1p−V1n) and the battery voltage Vb2 of the second rechargeable battery 12 (=V2p−V2n). Once the battery voltages of the rechargeable batteries are calculated, the charging circuit 13 can thereafter control the currents flowing through each of the rechargeable batteries in a manner similar to the second embodiment.

Whereas it was explained above that the FET 13e is connected with the negative side of the second rechargeable battery 12, it is possible alternatively to have second rechargeable the battery 12 connected with a current limiting circuit functionally similar to the second charge current limiting circuit 13d of the first embodiment.

The electrical apparatus 1c of the third embodiment, as with the first and the second embodiments, performs control such that the currents flowing through the rechargeable batteries do not exceed the maximum charge current and the maximum discharge current of any of the batteries. The third embodiment further allows the FET in the first charge current limiting circuit 13b and the FET 13e to function as a circuit for protecting the serially connected rechargeable batteries.

Fourth Embodiment

Figure 5:
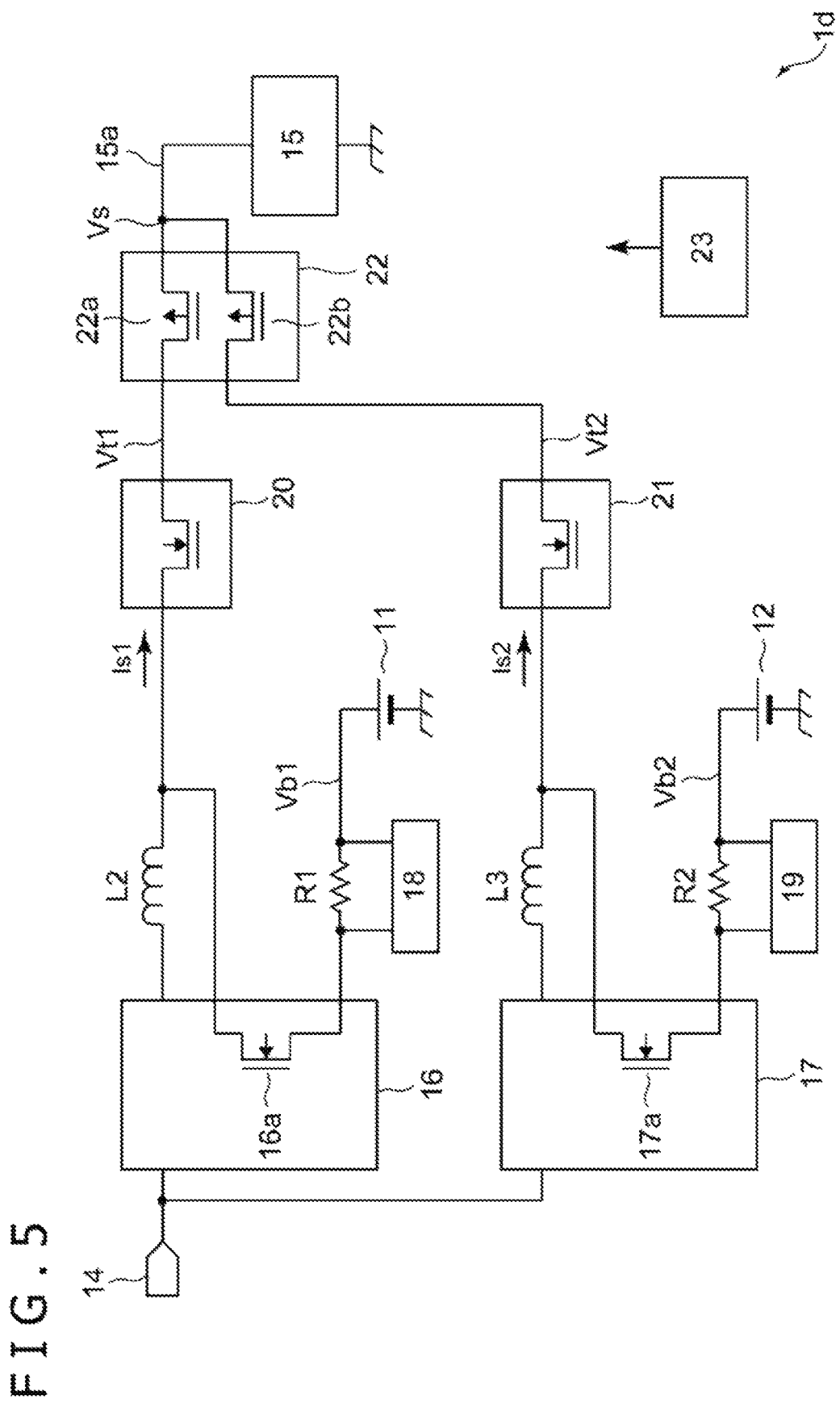
FIG. 5 depicts a circuit configuration of an electrical apparatus as a fourth embodiment of the present invention.

FIG. 5 depicts an overall circuit configuration of an electrical apparatus 1d as a fourth embodiment of the present invention. As illustrated in FIG. 5, the electrical apparatus 1d of the fourth embodiment is configured to incorporate the first rechargeable battery 11 and the second rechargeable battery 12. The electrical apparatus 1d includes a power supply terminal 14, a load 15, a first charging circuit 16, a second charging circuit 17, a first capacity calculation circuit 18, a second capacity calculation circuit 19, a first discharge current limiting circuit 20, a second discharge current limiting circuit 21, a switching circuit 22, and a control circuit 23. In the ensuing description, those components of the fourth embodiment that are functionally similar to those of the first through the third embodiments are also designated by the same reference signs and are not described in detail. It is assumed that in the fourth embodiment as in the first and the second embodiments, the maximum discharge current and the maximum charge current of the second rechargeable battery 12 are larger than those of the first rechargeable battery 11.

In the fourth embodiment, unlike in the first through the third embodiments, the first rechargeable battery 11 and the second rechargeable battery 12 are charged and discharged independently of each other in normal times. That means there is no situation where a circulating current would flow between the first rechargeable battery 11 and the second rechargeable battery 12 while none of the batteries is charged or discharged as in the first or the second state discussed above.

In the fourth embodiment, as depicted in FIG. 5, the charging circuit 13 used by the above-described embodiments is replaced by the first charging circuit 16 and by the second charging circuit 17 for independently charging the rechargeable batteries. The first charging circuit 16 and the second charging circuit 17 may each be an independent integrated circuit. The input side of the first charging circuit 16 and that of the second charging circuit 17 are connected with the power supply terminal 14. The output side of the first charging circuit 16 and that of the second charging circuit 17 are connected with the load 15 via coils L2 and L3, respectively. The first charging circuit 16 is connected with the first rechargeable battery 11 via a resistor R1, and the second charging circuit 17 is connected with the second rechargeable battery 12 via a resistor R2.

Specifically, the first charging circuit 16 charges the first rechargeable battery 11 by converting the power supplied from the external power supply into an output voltage Vs1 for output. The first charging circuit 16 includes an FET 16a connected serially with the first rechargeable battery 11. The first charging circuit 16 controls the output voltage Vs1 in such a manner that the current flowing through the FET 16a does not exceed the maximum charge current Ic1 of the first rechargeable battery 11. When the first rechargeable battery 11 is fully charged, the first charging circuit 16 turns off the FET 16a.

Likewise, the second charging circuit 17 charges the second rechargeable battery 12 by converting the power supplied from the external power supply into an output voltage Vs2 for output. The second charging circuit 17 incorporates an FET 17a connected serially with the second rechargeable battery 12. The second charging circuit 17 controls the output voltage Vs2 in such a manner that the current flowing through the FET 17a does not exceed the maximum charge current Ic2 of the second rechargeable battery 12. When the second rechargeable battery 12 is fully charged, the second charging circuit 17 turns off the FET 17a. In this manner, the fourth embodiment causes each of the charging circuits to charge the rechargeable battery connected independently therewith so that the currents flowing through the rechargeable batteries do not exceed the maximum charge currents thereof.

The first capacity calculation circuit 18 and the second capacity calculation circuit 19 calculate the capacities of the rechargeable batteries corresponding respectively thereto. Specifically, the first capacity calculation circuit 18, connected in parallel with the resistor R1, measures the current I1 flowing through the resistor R1 and the battery voltage Vb1 of the first rechargeable battery 11. On the basis of the measurements taken, the first capacity calculation circuit 18 calculates the battery capacity of the first rechargeable battery 11 at the time of the measurement. The second capacity calculation circuit 19, connected in parallel with the resistor R2, measures the current I2 flowing through the resistor R2 and the battery voltage Vb2 of the second rechargeable battery 12. On the basis of the measurements taken, the second capacity calculation circuit 19 calculates the battery capacity of the second rechargeable battery 12 at the time of the measurement.

The first discharge current limiting circuit 20 includes an FET, and monitors a current Is1 flowing from the first rechargeable battery 11 to the load 15. In the case where the magnitude of the current Is1 exceeds a predetermined upper limit It1, the first discharge current limiting circuit 20 notifies the control circuit 23 to that effect. Here, the upper limit It1 is a value not exceeding the maximum discharge current Id1 of the first rechargeable battery 11. As with the first discharge current limiting circuit 20, the second discharge current limiting circuit 21 includes an FET and monitors a current Is2 flowing from the second rechargeable battery 12 to the load 15. In the case where the magnitude of the current Is2 exceeds a predetermined upper limit It2, the second discharge current limiting circuit 21 notifies the control circuit 23 to that effect. Here, the upper limit It2 is a value not exceeding the maximum discharge current Id2 of the second rechargeable battery 12. A specific method by which these current limiting circuits limit currents will be discussed later.

The switching circuit 22 incorporates FETs 22a and 22b that function as switching elements. The FET 22a is connected with the output of the first discharge current limiting circuit 20. The FET 22b is connected with the output of the second discharge current limiting circuit 21. The output of the switching circuit 22 is connected with the power supply path 15a. The power supplied from the first rechargeable battery 11 and/or from the second rechargeable battery 12 is input to the load 15 via the power supply path 15a. Under instructions from the control circuit 23, the switching circuit 22 turns on or off these FETs to switch the source of power supply for the load 15 between the first rechargeable battery 11 and the second rechargeable battery 12.

What follows is an explanation of the specifics of the switching control executed by the control circuit 23. During operation of the load 15, the control circuit 23 periodically acquires information regarding an output-side voltage Vt1 of the first discharge current limiting circuit 20 and an output-side voltage Vt2 of the second discharge current limiting circuit 21 from these current limiting circuits. The voltages Vt1 and Vt2 vary with the battery voltages of the corresponding rechargeable batteries. Using the acquired voltage information, the control circuit 23 switches the input to the load 15 either from the first rechargeable battery 11 to the second rechargeable battery 12 or vice versa.

Specifically, when the load 15 is powered, the control circuit 23 switches the input in such a manner that the power is supplied from the rechargeable battery whose battery voltage is higher than the other battery. That is, in the case where Vt1>Vt2, the switching circuit 22 turns on the FET 22a and turns off the FET 22b. This causes the load 15 to operate on the power supplied from the first rechargeable battery 11. Conversely, in the case where Vt1<Vt2, the switching circuit 22 turns off the FET 22a and turns on the FET 22b. This causes the load 15 to operate on the power supplied from the second rechargeable battery 12. The values of the voltages Vt1 and Vt2 for use in determining whether or not to perform input switching may be obtained by calculating a moving average of measurements taken multiple times, for example.

Furthermore, in the case where the battery voltage of the currently discharged rechargeable battery drops below the battery voltage of the other rechargeable battery, the control circuit 23 switches the power supply source to the other rechargeable battery. To prevent excessively frequent switching from one rechargeable battery to another, the control circuit 23 switches the rechargeable batteries at the time the voltage difference therebetween becomes equal to or more than a predetermined threshold value Vth. As a specific example, suppose that during operation of the load 15 using the power from the first rechargeable battery 11, the battery voltage of the first rechargeable battery 11 drops to such an extent that the condition of Vt1<Vt2−Vth is met. In this case, the control circuit 23 switches the source of power supply from the first rechargeable battery 11 to the second rechargeable battery 12. Conversely, suppose that during operation of the load 15 using the power from the second rechargeable battery 12, the battery voltage of the second rechargeable battery 12 drops to such an extent that the condition of Vt2<Vt1−Vth is met. In this case, the control circuit 23 switches the source of power supply from the second rechargeable battery 12 to the first rechargeable battery 11. In this manner, the first rechargeable battery 11 and the second rechargeable battery 12 are alternated in order to supply the power for operating the load 15.

Figure 6:
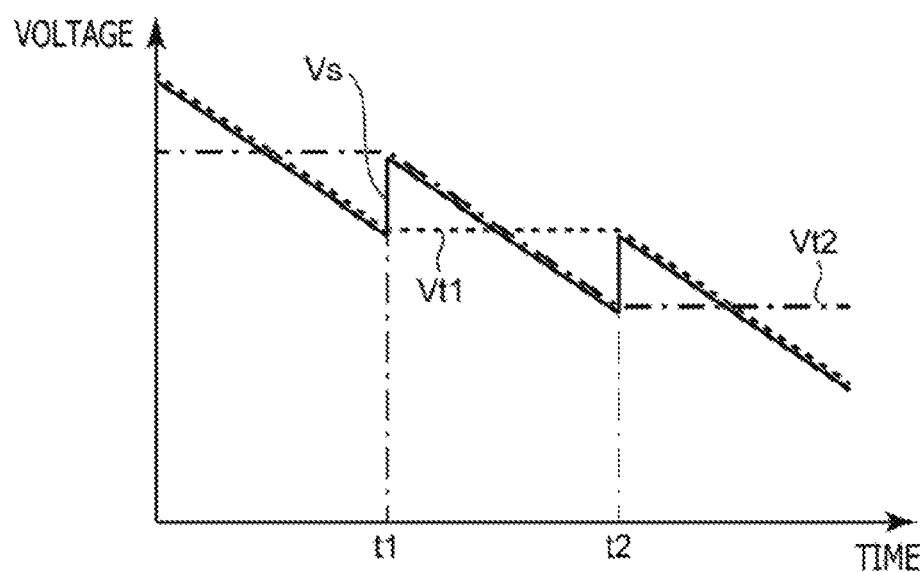
FIG. 6 explains the control for switching the power supply source as implemented by the electrical apparatus as the fourth embodiment of the present invention.

FIG. 6 is a graph that schematically explains specifics of the above-described switching control on the power supply source. In this graph, the horizontal axis stands for time and the vertical axis for voltage. Plotted in the graph are simplified variations in the measured voltages Vt1 and Vt2 and in the voltage Vs supplied to the load 15. Voltage drops due to the FETs or the like are ignored here. In this graph, the power supply source is switched from the first rechargeable battery 11 to the second rechargeable battery 12 at time t1 and vice versa at time t2.

When a rechargeable battery is continuously discharged, its battery voltage gradually drops to approach a final voltage (i.e., an operable voltage minimally required to operate the electrical apparatus 1d). Thus, when one rechargeable battery while powering the load 15 has its battery voltage dropped to the final voltage or below, the control circuit 23 forcibly switches the source of power supply to the other rechargeable battery. In the case where both rechargeable batteries have reached the final voltage, the electrical apparatus 1d enters a state of battery exhaustion.

During the discharge control explained above, the FETs incorporated in the first discharge current limiting circuit 20 and in the second discharge current limiting circuit 21 remain turned on, and the currents flowing through these FETs are monitored. In the case where the magnitude of the current flowing through any of the current limiting circuits exceeds a predetermined upper limit, the control circuit 23 controls the relevant current limiting circuit to prevent currents exceeding the upper limit from flowing out of the corresponding rechargeable battery. Explained below are some specific examples in which currents are limited by the current limiting circuits.

As a first example, if the magnitude of the current flowing through one of the current limiting circuits exceeds the upper limit, the FET incorporated in the applicable current limiting circuit may be turned off so as to switch the power supply source to the other rechargeable battery. Specifically, suppose that during operation of the load 15 using the power from the first rechargeable battery 11, the magnitude of the current Is1 flowing through the first discharge current limiting circuit 20 exceeds the upper limit It1. In this case, the control circuit 23 turns off the FET in the first discharge current limiting circuit 20, turns off the FET 22a and turns on the FET 22b in the switching circuit 22. This enables the load 15 from this point onward to operate on the power supplied from the second rechargeable battery 12. Currents exceeding the upper limit It1 are thus prevented from flowing through the first discharge current limiting circuit 20.

In the first example, the control circuit 23 may resume the supply of power from the first rechargeable battery 11 depending on the subsequent operating state of the load 15. Specifically, for example, the control circuit 23 monitors the current Is2 flowing through the second discharge current limiting circuit 21. When the magnitude of the current Is2 drops to the upper current limit It1 for the first discharge current limiting circuit 20 or below, the control circuit 23 turns on the FET in the first discharge current limiting circuit 20 to resume the supply of power from the first rechargeable battery 11. In this case, the value of the current Is2 to be compared with the upper limit It1 may be obtained by calculating a moving average of measurements taken multiple times, for example. Alternatively, the control circuit 23 may measure the magnitude of the currently flowing current by periodically turning on the FET in the first discharge current limiting circuit 20 and the FET 22a in the switching circuit 22. If the measured current Is1 exceeds the upper limit It1, these FETs are again turned off to continue the supply of power from the second rechargeable battery 12. On the other hand, if the measured current Is1 drops to the upper limit It1 or below, the FETs are kept turned on to resume the supply of power from the first rechargeable battery 11.

Explained next is a second example in which the first discharge current limiting circuit 20 and the second discharge current limiting circuit 21 function as constant current circuits. In this example, when the magnitude of the current Is1 flowing through the first discharge current limiting circuit 20 does not exceed the upper limit It1 during operation using power supplied from the first rechargeable battery 11, the first discharge current limiting circuit 20 allows the current to flow without imposing limits thereon. On the other hand, if the current Is1 flowing through the first discharge current limiting circuit 20 is about to exceed the upper limit It1 due to an increase in the current demanded by the load 15, the first discharge current limiting circuit 20 functions as a constant current circuit that limits the magnitude of the current down to the upper limit It1.

The above limiting of currents entails a voltage drop. If, as a result of this, the voltage Vt1 drops below the voltage Vt2−Vth, the control circuit 23 turns off the FET 22a and turns on the FET 22b in the switching circuit 22 to switch the power supply source to the second rechargeable battery 12 as discussed above.

It was explained above that either the first rechargeable battery 11 or the second rechargeable battery 12 supplies power to the load 15. Alternatively, in the case where the voltages Vt1 and Vt2 are close to the same potential, the two rechargeable batteries may be arranged to supply power simultaneously to the load 15. As another alternative, the simultaneous supply of power by the two batteries may be carried out particularly when a large current is demanded by the load 15. This improves power supply efficiency.

As a specific example, when the difference between Vt1 and Vt2 becomes less than a predetermined threshold value Vth2 and when the current demanded by the load 15 becomes equal to or more than a predetermined threshold value Ith1 at the same time, the control circuit 23 turns on both the FET 22a and the FET 22b to let the two batteries supply power. The threshold value Vth2 is determined in such a manner that when the two rechargeable batteries are connected in parallel, the circulating current occurring therebetween does not exceed the maximum discharge current and the maximum charge current of each of the rechargeable batteries. In this state, if the current demanded by the load 15 drops below the predetermined threshold value Ith2, the control circuit 23 stops the simultaneous supply of power from both rechargeable batteries and switches the power supply source to one of the rechargeable batteries that is determined on the basis of the voltages Vt1 and Vt2 at that point. In this case, the threshold values Ith1 and Ith2 should preferably have hysteresis such that the power supply source is not switched in an excessively frequent manner.

The control circuit 23 may also carry out the above-described switching control during charging. When the external power supply is being connected, the electrical apparatus 1d of the fourth embodiment may charge multiple rechargeable batteries either simultaneously or individually. In the latter case, the control circuit 23, for example, determines which of the rechargeable batteries is to be charged on the basis of information collected regarding the battery voltages of the rechargeable batteries involved. Specifically, the rechargeable battery having the lower battery voltage is preferentially charged. When the battery voltage of the currently charged rechargeable battery exceeds the battery voltage of the other rechargeable battery by at least a threshold value Vth3, the control circuit 23 switches the charging to another rechargeable battery. Repeating this type of control makes it possible to perform constant current charging while the battery voltages of both rechargeable batteries are kept close to each other. When the multiple rechargeable batteries have all reached a battery voltage that requires constant voltage charging, the both rechargeable batteries are simultaneously charged with a constant voltage. Compared with the case where the both rechargeable batteries are charged simultaneously from the start, this type of control reduces the power supply performance required of the external power supply. It is also possible to suppress the generation of heat from the charging circuits. Whereas it was explained above that one of the rechargeable batteries is determined to be charged upon comparison of their battery voltages, the battery to be charged may be selected alternatively by comparing the absolute values of the battery capacities (Ah) of the rechargeable batteries or their capacity percentages (%) calculated by the first capacity calculation circuit 18 and by the second capacity calculation circuit 19.

As with the second embodiment, the fourth embodiment does not necessarily require the presence of the second discharge current limiting circuit 21 provided that the magnitude of the current demanded by the load 15 does not exceed the maximum discharge current Id2 of the second rechargeable battery 12.

As described above, the electrical apparatus as any one of the embodiments of this invention can perform control in such a manner that where multiple rechargeable batteries are used, the charge current and discharge current flowing to and from any of the rechargeable batteries do not exceed the maximum charge currents or the maximum discharge currents of the rechargeable batteries.

The embodiments of the present invention are not limited to those discussed above. For example, the FETs described above may be replaced with other suitable switching elements. Also, whereas it was explained above that the charging circuits are of the DC/DC converter type, each charging circuit may be of some other suitable type such as the LDO type. Further, the functions described above as implemented using multiple integrated circuits independent of each other may be implemented using a single integrated circuit instead. Conversely, the functions described above as implemented using a single integrated circuit may be implemented alternatively in a distributed manner involving multiple integrated circuits. Furthermore, the circuit configurations of the electrical apparatus are not limited to those discussed above and may be replaced with some other suitable configuration providing similar functions.

Whereas it was explained above that two rechargeable batteries are subjected to the charging control, three or more rechargeable batteries may be subjected to similar controls. In such a case, too, at least part of the multiple rechargeable batteries may be serially connected with a charge current limiting circuit and with a discharge current limiting circuit to make sure that the current flowing through each rechargeable battery does not exceed the maximum charge current or the maximum discharge current each rechargeable battery.

REFERENCE SIGNS LIST 1a, 1b, 1c, 1d Electrical apparatus, 11 First rechargeable battery, 12 Second rechargeable battery, 13 Charging circuit, 13a First discharge current limiting circuit, 13b First charge current limiting circuit, 13c Second discharge current limiting circuit, 13d Second charge current limiting circuit, 14 Power supply terminal, 15 Load, 15a Power supply path, 16 First charging circuit, 17 Second charging circuit, 18 First capacity calculation circuit, 19 Second capacity calculation circuit, 20 First discharge current limiting circuit, 21 Second discharge current limiting circuit, 22 Switching circuit, 23 Control circuit.

The invention claimed is:

1. An electrical apparatus incorporating a first rechargeable battery and a second rechargeable battery connected in parallel with the first rechargeable battery, the second rechargeable battery having an allowable maximum discharge current larger than that of the first rechargeable battery, the electrical apparatus comprising:
 a power supply path configured to input power supplied from the first rechargeable battery and from the second rechargeable battery to a load; and
 a discharge current limiting circuit connected serially with the first rechargeable battery and configured to perform control in such a manner that a discharge current flowing from the first rechargeable battery to the second rechargeable battery and/or to the power supply path does not exceed the allowable maximum discharge current of the first rechargeable battery.

2. The electrical apparatus according to claim 1, wherein the discharge current limiting circuit is operated when a battery voltage of the first rechargeable battery is higher than that of the second rechargeable battery.

3. The electrical apparatus according to claim 1, wherein the discharge current limiting circuit is operated when the discharge current flowing from the first rechargeable battery to the power supply path due to operation of the load is about to exceed the allowable maximum discharge current of the first rechargeable battery.

4. The electrical apparatus according to claim 1, wherein
 the second rechargeable battery has an allowable maximum charge current larger than that of the first rechargeable battery; and
 the electrical apparatus further comprises a charge current limiting circuit connected serially with the first rechargeable battery and configured to perform control in such a manner that a charge current flowing from an external power supply source and/or from the second rechargeable battery to the first rechargeable battery does not exceed the allowable maximum charge current of the first rechargeable battery.

5. The electrical apparatus according to claim 4, wherein the charge current limiting circuit is operated when the battery voltage of the second rechargeable battery is higher than that of the first rechargeable battery.

6. The electrical apparatus according to claim 4, wherein the charge current limiting circuit is operated when the first rechargeable battery and the second rechargeable battery are both charged.

7. The electrical apparatus according to claim 1, further comprising: a switching circuit connected with the power supply path and configured to switch a source of power supply for output to the power supply path either from the first rechargeable battery to the second rechargeable battery or vice versa.

8. The electrical apparatus according to claim 7, wherein the switching circuit switches the source of power supply to the power supply path in accordance with the battery voltage of the first rechargeable battery and that of the second rechargeable battery.

* * * * *